United States Patent
Baba et al.

(10) Patent No.: US 10,570,975 B2
(45) Date of Patent: Feb. 25, 2020

(54) FRICTION MATERIAL COMPOSITION, FRICTION MATERIAL, AND FRICTION MEMBER

(71) Applicant: HITACHI CHEMICAL COMPANY, LTD., Tokyo (JP)

(72) Inventors: Kazuya Baba, Tokyo (JP); Teruyuki Nagayoshi, Tokyo (JP)

(73) Assignee: HITACHI CHEMICAL COMPANY, LTD., Tokyo (JP)

(*) Notice: Subject to any disclaimer, the term of this patent is extended or adjusted under 35 U.S.C. 154(b) by 12 days.

(21) Appl. No.: 16/072,214

(22) PCT Filed: Jan. 27, 2016

(86) PCT No.: PCT/JP2016/052361
§ 371 (c)(1),
(2) Date: Jul. 24, 2018

(87) PCT Pub. No.: WO2017/130332
PCT Pub. Date: Aug. 3, 2017

(65) Prior Publication Data
US 2019/0024744 A1    Jan. 24, 2019

(51) Int. Cl.
*F16D 69/02* (2006.01)
*C09K 3/14* (2006.01)
*F16D 65/12* (2006.01)
*F16D 69/00* (2006.01)

(52) U.S. Cl.
CPC ............ *F16D 69/026* (2013.01); *C09K 3/149* (2013.01); *F16D 65/126* (2013.01); *F16D 69/028* (2013.01); *F16D 2069/002* (2013.01); *F16D 2200/0052* (2013.01); *F16D 2200/0065* (2013.01); *F16D 2200/0069* (2013.01)

(58) Field of Classification Search
CPC ..... C09K 3/149; F16D 65/126; F16D 69/026; F16D 69/028; F16D 2069/002; F16D 2200/0052; F16D 2200/0065; F16D 2200/0069

See application file for complete search history.

(56) References Cited

U.S. PATENT DOCUMENTS

| 6,635,349 B2 * | 10/2003 | Horiya .................. F16D 69/026 106/36 |
| 7,740,698 B2 * | 6/2010 | Kitami .................. F16D 69/026 106/36 |
| 2008/0156226 A1 | 7/2008 | Kitami et al. |
| 2019/0024744 A1 * | 1/2019 | Baba .................... F16D 69/026 |

FOREIGN PATENT DOCUMENTS

| JP | H09-071768 A | 3/1997 |
| JP | 2002-138273 A | 5/2002 |

* cited by examiner

*Primary Examiner* — Anthony J Green
(74) *Attorney, Agent, or Firm* — Fitch, Even, Tabin & Flannery, LLP

(57) ABSTRACT

Provided is a friction material composition including: a binder; an organic filler; an inorganic filler; and a fiber substrate, in which a content of copper as an element is 0.5% by mass or less, the friction material composition contains at least one of phlogopite or biotite in a total of from 3% by mass to 9% by mass, and a graphite in an amount of from 2% by mass to 6% by mass, as the inorganic fillers, the at least one of phlogopite or biotite has an average particle size of from 340 μm to 1,500 μm, and the graphite has an average particle size of from 450 μm to 1,100 μm.

15 Claims, No Drawings ically classified into: high-frequency squealing sound (1,000 Hz or higher) generated during braking; and low-frequency noise (i.e., low-frequency-band squeals of several tens to several hundreds in Hz) generated when, for example, an automobile comes to a stop late in the braking period, immediately after the stop, or when the brake pedal is released. These squeals are offensive to the ears of the users and cause discomfort to the users. Moreover, a low-

FRICTION MATERIAL COMPOSITION, FRICTION MATERIAL, AND FRICTION MEMBER

CROSS-REFERENCE TO RELATED APPLICATIONS

This application is a U.S. national phase application filed under 35 U.S.C. § 371 of International Application No. PCT/JP2016/052361, filed Jan. 27, 2016, designating the United States, the entire content of which is hereby incorporated herein by reference.

TECHNICAL FIELD

The present invention relates to a friction material composition, a friction material, and a friction member.

BACKGROUND ART

Generally, as the brakes mounted on automobiles and the like, disc brakes and drum brakes are mainly employed. In the disc brakes or drum brakes, for example, disc brakes pads and brake linings are used as friction materials. Examples of the friction materials used in the disc brake pads, brake linings and the like include friction materials that are formed using a friction material composition containing a binder, a fiber substrate, a metal powder, an inorganic filler, an organic filler and the like. Such friction materials are known to not only exhibit excellent friction coefficient stability, but also have excellent low-noise properties causing limited unpleasant noise, vibrations and the like. Therefore, friction materials formed using such a friction material composition have been widely adopted in major regions excluding Europe, such as Japan, North America, South America and Asia. The friction materials, such as disc brake pads and brake linings, play a part in braking by generating friction with a facing material (e.g., a disc rotor or a brake drum) and thereby converting the kinetic energy thereof into heat energy.

Incidentally, there may be a case where the conversion of the kinetic energy into heat energy involves partial conversion of the kinetic energy into vibration energy. In this case, the vibration energy generates vibrations, squeals and the like due to braking, thereby causing the user to feel discomfort and impairing the merchantability of the friction material. Therefore, friction materials are demanded not only to have high friction coefficient, friction coefficient stability and abrasion resistance, but also to be unlikely to generate squeals, vibrations and the like. Further, friction materials are also demanded to have sufficient strength such that they are not cracked during braking and to provide a long pad life, as well as to be unlikely to cause abrasion of a facing material and generation of wheel dust.

In recent years, as the needs of the automobile users, there is an increasing demand for further improvement in the comfortability (e.g., riding comfort and damping properties) and, in this respect, reduction in squeals, vibrations and the like is a very important requirement. Particularly, squeals are generally classified into: high-frequency squealing sound (1,000 Hz or higher) generated during braking; and low-frequency noise (i.e., low-frequency-band squeals of several tens to several hundreds in Hz) generated when, for example, an automobile comes to a stop late in the braking period, immediately after the stop, or when the brake pedal is released. These squeals are offensive to the ears of the users and cause discomfort to the users. Moreover, a low-frequency noise may be taken as such an automobile defect that is associated with malfunction of the automobile. Therefore, suppression of low-frequency noise is included in the important properties required for brakes and, in order to satisfy this property, there is a demand for further improvement in friction materials.

Friction materials generally contain a binder, a fiber substrate, a metal powder, an inorganic filler, an organic filler and the like and, in order to allow each friction material to express the above-described properties, each component is used singly, or in combination of two or more kinds thereof. As the fiber substrate, for example, organic fibers, metal fibers or inorganic fibers are used and, particularly, in order to improve the abrasion resistance, the friction coefficient stability after heat history, the crack resistance and the like, fibers of copper, copper alloy or the like are used in a large amount as the metal fibers.

Recently, however, it has been suggested that the use of such a copper or copper alloy-containing friction material causes, for example, pollution of rivers, lakes, oceans and the like since abrasion powder thereof generated by braking contain a large amount of copper. Thus, laws restricting the amount of a copper component used in a friction material have already been enforced mainly in the states of California and Washington. Accordingly, in order to provide a friction material that has favorable friction coefficient, abrasion resistance and rotor abrasion resistance without containing a metal such as copper or copper alloy, Japanese Patent Application Laid-Open (JP-A) No. 2002-138273 proposes a brake friction material containing magnesium oxide and graphite in an amount of from 45% by volume to 80% by volume, wherein the volume ratio of magnesium oxide and graphite (magnesium oxide/graphite) is from 1/1 to 4/1.

SUMMARY OF INVENTION

Technical Problem

However, in the brake friction material described in JP-A No. 2002-138273, it is difficult to satisfy the required properties for all of the friction coefficient stability after heat history, the low-frequency noise resistance, the abrasion resistance, and the crack resistance.

Meanwhile, as non-copper metal fibers contained in friction materials, iron-based fibers such as steel fibers or cast iron fibers are sometimes used for the purposes of improving the brake effectiveness and reinforcing the friction materials. However, since iron-based fibers are highly offensive against a facing material, there is a problem in terms of the friction coefficient stability, and wheel dust is thus likely to be generated. An addition of such iron-based fibers in excess to a friction material also has a drawback of deteriorating the abrasion resistance. Moreover, nonferrous metal fibers other than copper-based fibers (e.g., zinc fibers and aluminum fibers) that are generally used in friction materials often have a lower heat resistance temperature than copper-based fibers and iron-based fibers, and have a problem of deteriorating the abrasion resistance of a friction material in a high-temperature state of about 300° C. or higher.

As described above, friction materials having a low copper content are poor in terms of the abrasion resistance, the crack resistance, the friction coefficient stability and the like, and it was difficult to obtain an excellent friction material that satisfies all of the performances of conventional friction materials.

In view of the above, an object of one embodiment of the invention is to provide: a friction material composition that is, even at a low content of copper and copper alloy, capable of yielding a friction material which has excellent friction coefficient stability, crack resistance and abrasion resistance and in which low-frequency noise is suppressed; and a friction material and a friction member, which include the friction material composition.

Solution to Problem

Concrete means for achieving the above-described object are as follows.

<1> A friction material composition comprising:
a binder;
an organic filler;
an inorganic filler; and
a fiber substrate, wherein:
a content of copper as an element is 0.5% by mass or less,
the friction material composition contains at least one of phlogopite or biotite in a total of from 3% by mass to 9% by mass, and a graphite in an amount of from 2% by mass to 6% by mass, as the inorganic fillers,
the at least one of phlogopite or biotite has an average particle size of from 340 μm to 1,500 μm, and
the graphite has an average particle size of from 450 μm to 1,100 μm.
<2> The friction material composition according to <1>, further comprising a metal sulfide in an amount of from 1% by mass to 9% by mass.
<3> The friction material composition according to <2>, wherein the metal sulfide is at least one selected from the group consisting of tin sulfide, antimony trisulfide, bismuth sulfide, zinc sulfide, and molybdenum disulfide.
<4> The friction material composition according to any one of <1> to <3>, wherein a content of metal fibers contained as the fiber substrate is 1.0% by mass or less.
<5> A friction material formed using the friction material composition according to any one of <1> to <4>.
<6> A friction member comprising the friction material according to <5>.

According to one embodiment of the invention, a friction material composition that is, even at a low content of copper and copper alloy, capable of yielding a friction material which has excellent friction coefficient stability, crack resistance and abrasion resistance and in which low-frequency noise is suppressed; and a friction material and a friction member, which include the friction material composition, are provided.

DESCRIPTION OF EMBODIMENTS

Mode for Carrying Out the Invention

Embodiments of the friction material composition, the friction material and the friction member according to the invention are described below in detail. It is noted here, however, that the invention is not restricted to the below-described embodiments. In the below-described embodiments, the constituents thereof are not necessarily indispensable unless otherwise specified. The same applies to the numerical values and ranges thereof, and the invention is not restricted by these elements.

The friction material composition of the invention is a so-called "non-asbestos friction material composition", which is a friction material composition containing no asbestos.

In the present specification, those numerical ranges that are expressed with "to" each denote a range that includes the numerical values stated before and after "to" as the minimum value and the maximum value, respectively.

In a set of numerical ranges that are stated stepwisely in the present specification, the upper limit value or the lower limit value of a numerical range may be replaced with the upper limit value or the lower limit value of other numerical range. Further, in a numerical range stated in the present specification, the upper limit or the lower limit of the numerical range may be replaced with a relevant value indicated in any of Examples.

In the present specification, when there are plural kinds of substances that correspond to a component of a composition, the content of the component in the composition means, unless otherwise specified, the total content of the plural kinds of substances existing in the composition.

In the present specification, when there are plural kinds of particles that correspond to a component of a composition, the particle size of the component in the composition means, unless otherwise specified, a value determined for a mixture of the plural kinds of particles existing in the composition.

In the present specification, the term "layer" encompasses, when a region where the layer exists is observed, not only a case where the layers is formed over the entirety of the region, but also a case where the layer is formed only on a part of the region.

[Friction Material Composition]

The friction material composition of the present embodiment includes: a binder; an organic filler; an inorganic filler; and a fiber substrate, wherein a content of copper as an element is 0.5% by mass or less, the friction material composition contains at least one of phlogopite and biotite in a total of from 3% by mass to 9% by mass and a graphite in an amount of from 2% by mass to 6% by mass as the inorganic fillers, the at least one of phlogopite and biotite has an average particle size of from 340 μm to 1,500 μm, and the graphite has an average particle size of from 450 μm to 1,100 μm.

The term "copper as an element" used herein represents the total content of elemental copper contained in copper, a copper alloy and a copper compound that are included in the friction material composition. In the friction material composition, the elemental copper contained in copper, a copper alloy and a copper compound may exist in any form, such as a fiber form or a powder form.

The total content of "copper as an element" in the friction material composition refers to a value measured in accordance with SAE J2975: Measurement of Copper and Other Elements in Brake Friction Materials, which is prescribed by SAE International (Society of Automotive Engineers).

In the friction material composition, incorporation of a mica as an inorganic filler is presumed to suppress low-frequency noise. Further, high-frequency squeals are presumed to be suppressed by using a specific kind of mica and controlling the particle size of the mica in a specific range. Moreover, by using a graphite having a specific particle size in combination with a specific kind of mica, it is presumed that not only low-frequency noise can be suppressed but also the friction coefficient is stabilized and the abrasion resistance and the crack resistance are improved.

In the friction material composition of the present embodiment, the content of copper as an element is 0.5% by mass or less; therefore, even if abrasion powder is generated by braking from a friction material formed using the friction material composition of the present embodiment, pollution of rivers, lakes, oceans and the like by copper is inhibited.

(Inorganic Filler)

Inorganic fillers are incorporated into friction material compositions as friction modifiers so as to prevent deterioration of the heat resistance, the abrasion resistance, the friction coefficient and the like of friction materials. The friction material composition of the present embodiment contains, as inorganic fillers, at least one of phlogopite and biotite, and a graphite.

(Mica)

Micas are known to have an effect of suppressing low-frequency noise when incorporated into a friction material composition. In the friction material composition of the present embodiment, low-frequency noise is suppressed by incorporating a mica having such an effect. In the present embodiment, at least one of phlogopite (bronze mica) or biotite (black mica) is used as the mica. In the present embodiment, as required, a mica other than phlogopite and biotite may also be incorporated. Examples of such other mica include muscovite and synthetic mica. However, when other mica (e.g., muscovite or synthetic mica) is used in combination, the mica content is preferably 10% by mass or less, more preferably 9% by mass or less, still more preferably 8% by mass or less.

By incorporating at least one of phlogopite or biotite as a mica, high-frequency squeals can also be suppressed.

As phlogopite and/or biotite used as a mica(s), phlogopite may be used singly, or biotite (a continuous solid solution of phlogopite and annite) may be used. Further, a mixture thereof may be used as well.

Phlogopite is known as a soft mica, and its chemical formula is $KMg_3AlSi_3O_{10}(OH)_2$. Phlogopite in which some of the Mg atoms are substituted with Fe is biotite (chemical formula: $K(Mg,Fe)_3AlSi_3O_{10}(OH)_2$), and biotite is a continuous solid solution of phlogopite and annite (iron mica, chemical formula: $KFe_3AlSi_3O_{10}(OH)_2$). Phlogopite and biotite are characterized by having a Mohs hardness of from 2.0 to 2.5 and being relatively soft among micas.

The molar ratio of Mg and Fe (Mg/Fe) in biotite is not particularly restricted; however, it is preferably 50/50 or higher, more preferably 60/40 or higher, still more preferably 80/20. It is noted here that, since biotite having a molar ratio (Mg/Fe) of 100/0 is phlogopite, the upper limit of a preferred range of the molar ratio (Mg/Fe) is lower than 100/0.

Meanwhile, muscovite (white mica, chemical formula: $KAl_2AlSi_3O_{10}(OH)_2$) known as a hard mica has a Mohs hardness of from 2.5 to 3.5, and synthetic mica (e.g., chemical formula: $KMg_3(AlSi_3)O_{10}F_2$) has a Mohs hardness of 3.4, both of which are relatively hard among micas.

In the friction material composition of the present embodiment, the total amount of the at least one of phlogopite or biotite is set to be from 3% by mass to 9% by mass and the average particle size of the at least one of phlogopite or biotite is controlled in a specific range, whereby low-frequency noise is suppressed. Micas having a larger particle size exert superior effect of suppressing low-frequency noise. On the other hand, micas having a coarse particle size cause a reduction in the strength of the friction material, making abrasion, cracking and the like more likely to occur. In this respect, by controlling the at least one of phlogopite or biotite contained in the friction material composition to have an average particle size of from 340 μm to 1,500 μm, not only low-frequency noise is effectively suppressed but also abrasion, cracking and the like can be made unlikely to occur. The average particle size of the at least one of phlogopite or biotite is preferably from 450 μm to 1,300 μm, more preferably from 600 μm to 1,100 μm.

In the present embodiment, the "average particle size" of the at least one of phlogopite or biotite refers to the average particle size of phlogopite when phlogopite is used singly, the average particle size of biotite when biotite is used singly, or the average particle size of a mixture of phlogopite and biotite when phlogopite and biotite are used in combination.

The ratio of phlogopite and biotite that have a particle size in a range of from 340 μm to 1,500 μm with respect to all of phlogopite and biotite is preferably from 10% by number to 90% by number, more preferably from 15% by number to 85% by number, still more preferably from 20% by number to 80% by number.

The average particle size can be measured using, for example, a laser diffraction/scattering-type particle size distribution analyzer LA-920 (manufactured by Horiba, Ltd.). The average particle size refers to the 50% (median) diameter determined from the thus obtained volume-based particle size distribution.

Examples of a method of extracting the mica(s) from the friction material composition include a method of extracting the mica(s) using a general microscope (light microscope) and Lucae forceps. As the microscope, for example, VHX-700F manufactured by KEYENCE Corporation can be used.

In the present embodiment, the particle size of each particle of phlogopite and biotite is the "circle-equivalent diameter", which is the diameter of a circle having the same area as a projected area that is determined based on an image taken under an electron microscope. Further, the ratio of phlogopite and biotite that have a particle size in a range of from 340 μm to 1,500 μm with respect to all of phlogopite and biotite is the ratio determined by measuring the particle size for each of at least 100 particles of phlogopite and biotite.

In order to obtain the effect of suppressing low-frequency noise that is exerted by phlogopite and biotite, it is necessary to control the total content of the at least one of phlogopite or biotite in the friction material composition to be a certain level or higher. On the other hand, when the total content of the at least one of phlogopite or biotite is excessively high, the strength of the friction material is reduced, making abrasion and cracking more likely to occur. Thus, by controlling the total content of the at least one of phlogopite or biotite in the friction material composition to be from 3% by mass to 9% by mass, low-frequency noise is suppressed, and superior abrasion resistance and crack resistance can be obtained. The total content of the at least one of phlogopite or biotite in the friction material composition is preferably from 4% by mass to 8% by mass, more preferably from 5% by mass to 7% by mass.

(Graphite)

The friction material composition of the present embodiment contains a graphite as an inorganic filler. A graphite of a certain particle size contributes to the stability of friction coefficient and has an effect of suppressing low-frequency noise. On the other hand, a graphite having a coarse particle size is likely to cause abrasion and makes the friction material more likely to be cracked. Therefore, by controlling the graphite contained in the friction material composition of the present embodiment to have an average particle size of from 450 μm to 1,100 μm, not only a reduction in the friction coefficient is inhibited and the friction coefficient is stabilized, but also low-frequency noise is suppressed and favorable abrasion resistance and crack resistance are obtained. The average particle size of the graphite is preferably from 500 μm to 1,000 μm, more preferably from 600 μm to 900 μm.

The ratio of graphite having a particle size in a range of from 450 μm to 1,100 μm with respect to the whole graphite is preferably from 10% by number to 90% by number, more preferably from 20% by number to 80% by number, still more preferably from 25% by number to 75% by number.

Examples of a method of extracting the graphite from the friction material composition include a method of extracting the graphite using a general microscope (light microscope) and Lucae forceps. As the microscope, for example, VHX-700F manufactured by KEYENCE Corporation can be used.

In the present embodiment, the particle size of each graphite particle is the "circle-equivalent diameter", which is the diameter of a circle having the same area as a projected area that is determined based on an image taken under an electron microscope. Further, the ratio of graphite having a particle size in a range of from 450 μm to 1,100 μm with respect to the whole graphite is the ratio determined by measuring the particle size for each of at least 100 graphite particles.

When the graphite is added in an excessively large amount, the strength of the friction material is reduced, making abrasion and cracking of the friction material more likely to occur. Accordingly, the content of the graphite in the friction material composition is from 2% by mass to 6% by mass. The content of the graphite in the friction material composition is preferably from 3% by mass to 5% by mass, more preferably from 3.5% by mass to 4.5% by mass.

The graphite may be in an agglomerate form or an aggregate form and, from the standpoint of inhibiting loss of the graphite, the graphite is preferably in an aggregate form.

Whether the graphite is in an agglomerate form or an aggregate form can be judged by observing an electron micrograph taken under a scanning electron microscope at a magnification of ×800.

Examples of the graphite used in the present embodiment include artificial graphites (e.g., petroleum pitch-based graphite and coal pitch-based graphite) and natural graphites, and these may be used singly, or in combination of two or more kinds thereof.

From the standpoints of low-frequency noise resistance and abrasion resistance, it is preferred to use a graphite having an intensity ratio of the G band and the D band (G/D ratio), which ratio represents the crystallinity of the graphite, of from 2.0 to 6.0. The G/D ratio is more preferably from 2.5 to 5.5, still more preferably from 3.0 to 5.0.

The G/D ratio is used as an index of the crystallinity of a graphite, and a larger value indicates a higher crystallinity of the graphite. The G/D ratio can be measured using, for example, a laser Raman spectrometer NRS-1000 (manufactured by JASCO Corporation).

In a Raman spectrum, the "G band" represents a peak in the vicinity of 1,580 $cm^{-1}$, and the "D band" represents a peak in the vicinity of 1,360 $cm^{-1}$.

By adopting the above-described constitution in the friction material composition of the present embodiment, since abrasion powder generated therefrom during braking contains only a small amount of copper, the friction material composition of the present embodiment is more environmentally friendly than conventional friction material compositions, and the friction material composition of the present embodiment can realize not only excellent friction coefficient stability, crack resistance and abrasion resistance but also suppression of low-frequency noise.

The friction material composition of the present embodiment preferably contains the below-described metal sulfide as an inorganic filler. Examples of a metal sulfide that can be used in the present embodiment include antimony trisulfide, tin sulfide, tin disulfide, molybdenum disulfide, iron sulfide, iron disulfide, bismuth sulfide, zinc sulfide and tungsten disulfide, and these metal sulfides may be used singly, or in combination of two or more kinds thereof. Thereamong, at least one selected from the group consisting of tin sulfide, antimony trisulfide, bismuth sulfide, zinc sulfide and molybdenum disulfide is preferably used. The content of the metal sulfide(s) in the friction material composition is preferably from 1% by mass to 9% by mass, more preferably from 3% by mass to 8% by mass, still more preferably from 3.5% by mass to 7% by mass, particularly preferably from 4% by mass to 6% by mass. By controlling the content of the metal sulfide(s) in the friction material composition to be in a range of from 1% by mass to 9% by mass, a reduction in the friction coefficient can be inhibited, and the crack resistance can be improved.

The friction material composition of the present embodiment may further contain an inorganic filler other than the mica, the graphite, and the metal sulfide(s) used as required. The other inorganic filler is not particularly restricted as long as it is an inorganic filler that is usually used in friction materials.

Examples of the material of the other inorganic filler include titanates (e.g., potassium titanate, lithium potassium titanate, sodium titanate, and magnesium potassium titanate), coke, calcium hydroxide, calcium oxide, sodium carbonate, calcium carbonate, magnesium carbonate, barium sulfate, dolomite, iron oxide, vermiculite, calcium sulfate, granular potassium titanate, plate-like potassium titanate, talc, clay, zeolite, zirconium silicate, zirconium oxide, mullite, chromite, titanium oxide, magnesium oxide, silica, iron oxide, garnet, α-alumina, γ-alumina and silicon carbide, and these inorganic fillers may be used singly, or in combination of two or more kinds thereof.

The content of the inorganic fillers in the friction material composition is preferably from 30% by mass to 80% by mass, more preferably from 40% by mass to 78% by mass, still more preferably from 50% by mass to 75% by mass. The term "inorganic fillers" used herein encompasses the above-described micas, graphites, and metal sulfides used as required. By controlling the content of the inorganic fillers in the friction material composition to be in a range of from 30% by mass to 80% by mass, a reduction in the heat resistance can be prevented.

(Binder)

The binder binds and integrates the organic filler, the inorganic filler, the fiber substrate and the like that are contained in the friction material composition and thereby imparts a prescribed shape and strength to the friction material composition. The binder contained in the friction material composition of the present embodiment is not particularly restricted, and any thermosetting resin that is commonly used as a binder of a friction material can be used.

Examples of the thermosetting resin include phenol resins (resol-type phenol resins and novolac-type phenol resins), epoxy resins, and polyimide resins, as well as various modified phenol resins, such as acryl-modified phenol resins, silicone-modified phenol resins, cashew-modified phenol resins, epoxy-modified phenol resins and alkylbenzene-modified phenol resins, and these thermosetting resins may be used singly, or in combination of two or more kinds thereof. Particularly, from the standpoint of providing favorable heat resistance, moldability and friction coefficient, it is preferred to use at least one selected from the group consisting of phenol resins, acryl-modified phenol resins, silicone-modified phenol resins, and alkylbenzene-modified phenol resins.

The content of the binder in the friction material composition is preferably from 5% by mass to 20% by mass, more preferably from 6% by mass to 14% by mass, still more preferably from 7% by mass to 10% by mass. By controlling the content of the binder in the friction material composition to be in a range of from 5% by mass to 20% by mass, a reduction in the strength of the friction material can be further suppressed, and deterioration of the sound vibration performance, such as squeals caused by a reduction in the porosity of the friction material and the resulting increase in the elastic modulus, can be further suppressed.

(Organic Filler)

The organic filler is incorporated as a friction modifier to improve the sound vibration performance, the abrasion resistance and the like of the friction material.

As the organic filler in the friction material composition of the present embodiment, for example, cashew particles or rubber particles that are normally used as organic fillers in friction materials can be used.

The cashew particles may be any cashew particles that are normally used in friction materials. Examples of such cashew particles include particles obtained by grinding cured cashew nut shell oil.

Examples of a rubber component of the rubber particles include tire rubbers, natural rubbers, acrylonitrile-butadiene rubbers (NBR), acrylic rubbers, isoprene rubbers, polybutadiene rubbers (BR), styrene-butadiene rubbers (SBR) and silicone rubbers, and these rubber components may be used singly, or in combination of two or more kinds thereof. In addition, the cashew particles and the rubber particles may be used in combination, or the cashew particles coated with the rubber component may be used as well.

The content of the organic filler in the friction material composition is preferably from 1% by mass to 20% by mass, more preferably from 1% by mass to 10% by mass, still more preferably from 4% by mass to 8% by mass. By controlling the content of the organic filler in a range of from 1% by mass to 20% by mass, the vibration damping property of the friction material is improved, so that deterioration of the sound vibration performance, such as squealing, can be prevented. In addition, deterioration of the heat resistance as well as reduction in the strength caused by heat history can be prevented.

When cashew particles and rubber particles are used in combination, the mass ratio of the cashew particles and the rubber particles (cashew particles:rubber particles) is preferably from 1:4 to 10:1, more preferably from 1:3 to 9:1, still more preferably from 1:2 to 8:1.

(Fiber Substrate)

In the friction material, the fiber substrate is incorporated to exert a reinforcing effect. In the friction material composition of the present embodiment, for example, inorganic fibers, metal fibers, organic fibers and carbon fibers that are normally used as a fiber substrate in the field of friction material compositions can be used, and these fibers may be used singly, or in combination of two or more kinds thereof.

Examples of the inorganic fibers that can be used include ceramic fibers, biodegradable ceramic fibers, mineral fibers, glass fibers, potassium titanate fibers, silicate fibers and wollastonite, and these inorganic fibers may be used singly, or in combination of two or more kinds thereof.

Examples of the carbon fibers that can be used include flame-resistant fibers, pitch-based carbon fibers, PAN (polyacrylonitrile)-based carbon fibers and active carbon fibers, and these inorganic fibers may be used singly, or in combination of two or more kinds thereof.

The term "mineral fibers" used herein refer to artificial inorganic fibers obtained by melt-spinning a blast-furnace slag (e.g., slag wool), basalt (e.g., basalt fibers), other rock or the like as a main component. The mineral fibers are more preferably fibers derived from a natural mineral containing an Al element. Specifically, fibers in which $SiO_2$, $Al_2O_3$, CaO, MgO, FeO, $Na_2O$ and the like are contained singly, or in combination of two or more thereof, can be used, and mineral fibers containing an Al element among such minerals can be more preferably used.

The shorter the average fiber length of the mineral fibers contained in the friction material composition, the further the adhesive strength tends to be improved; therefore, the average fiber length of the mineral fibers is preferably 500 μm or less, more preferably from 100 μm to 400 μm, still more preferably from 110 μm to 350 μm.

The term "average fiber length" used herein refers to the number-average fiber length that represents an average value of the lengths of the mineral fibers. The average fiber length means an arithmetic mean of the fiber lengths of 50 mineral fibers that are randomly selected and measured under a light microscope. For example, "average fiber length of 200 μm" indicates that, when 50 mineral fibers used as a material of the friction material composition are randomly selected and their lengths are measured under a light microscope, the average of the thus measured values is calculated to be 200 μm.

The mineral fibers used in the present embodiment are preferably biosoluble. A "biosoluble" mineral fiber refers to a mineral fiber characterized in that, even when taken into the human body, it is partially degraded and excreted from the body within a prescribed time. Specifically, a "biosoluble" mineral fiber represents a fiber that satisfies the following conditions: the total content of alkali metal oxides and alkaline earth metal oxides (total content of oxides of sodium, potassium, calcium, magnesium and barium) in the chemical composition is not less than 18% by mass; and the fiber of 20 μm or longer shows a weighted half-life of 40 days or shorter in a short-term biopersistence test by inhalation, or the fiber shows no evidence of excess carcinogenicity in an intra-peritoneal test, or the fiber shows no relevant pathogenicity or tumorigenesis in a long-term inhalation test (Nota Q of EU Directive 97/69/EC (exemption from carcinogen classification)). Examples of such a biosoluble mineral fiber include $SiO_2$—$Al_2O_3$—CaO—MgO—FeO—$Na_2O$ fibers, and fibers containing $SiO_2$, $Al_2O_3$, CaO, MgO, FeO, $Na_2O$ and the like in any combination. Examples of commercially available products thereof include ROXUL Series manufactured by Lapinus Fibres B.V. The "ROXUL" fibers contain $SiO_2$, $Al_2O_3$, CaO, MgO, FeO, $Na_2O$, and/or the like.

As the metal fibers, copper fibers or copper alloy fibers can be used so as to improve the crack resistance and the abrasion resistance. It is noted here that, when copper fibers or copper alloy fibers are incorporated, the content thereof in the friction material composition is preferably 0.5% by mass or less, taking into consideration the effects on the environment.

As the copper fibers or copper alloy fibers, for example, copper fibers, brass fibers and bronze fibers can be used, and these fibers may be used singly, or in combination of two or more kinds thereof.

Alternatively, as the metal fibers, metal fibers other than copper fibers and copper alloy fibers may be used as well. The content of such other metal fibers in the friction material composition is preferably 0.5% by mass or less. The metal fibers other than copper fibers and copper alloy fibers may be incorporated also from the standpoint of improving the friction coefficient and the crack resistance and, by controlling the content thereof to be 0.5% by mass or less, a reduction in the abrasion resistance can be prevented.

Examples of the metal fibers other than copper fibers and copper alloy fibers include fibers that are made of a simple metal (e.g., aluminum, iron, zinc, tin, titanium, nickel, magnesium, or silicon) or in the form of an alloy thereof; and fibers containing a metal as a main component, such as cast iron fibers, and these fibers may be used singly, or in combination of two or more kinds thereof.

In the friction material composition of the present embodiment, the content of the metal fibers incorporated as the fiber substrate is preferably 1.0% by mass or less, more preferably 0.5% by mass or less, still more preferably 0% by mass.

Examples of the organic fibers that can be used include aramid fibers, cellulose fibers, acrylic fibers, and phenol resin fibers having a cross-linked structure, and these organic fibers may be used singly, or in combination of two or more kinds thereof. As the organic fibers, it is preferred to use aramid fibers from the standpoint of heat resistance.

The content of the fiber substrate in the friction material composition is preferably from 5% by mass to 40% by mass, more preferably from 5% by mass to 20% by mass, still more preferably from 5% by mass to 15% by mass. By controlling the content of the fiber substrate in a range of from 5% by mass to 40% by mass, not only an optimum porosity is attained as a friction material and squeals can thus be inhibited, but also an appropriate material strength is attained and abrasion resistance is expressed, so that the moldability tends to be improved.

(Other Materials)

The friction material composition of the present embodiment may also contain other material(s) as required, in addition to the above-described binder, organic filler, inorganic filler and fiber substrate.

From the standpoint of abrasion resistance, examples of the other materials include organic additives, such as fluorocarbon polymers (e.g., PTFE (polytetrafluoroethylene)).

[Friction Material]

The friction material of the present embodiment is formed using the friction material composition of the present embodiment. The friction material of the present embodiment can be used as a friction material of, for example, disc brake pads and brake linings that are used in automobiles. The friction material of the present embodiment exhibits excellent friction coefficient stability, low-frequency noise resistance and crack resistance and is, therefore, suitable as a friction material of a disc brake pad subjected to a large load during braking.

The friction material of the present embodiment can be produced by molding the friction material composition of the present embodiment in accordance with a method that is commonly employed. Preferably, the friction material of the present embodiment is produced by hot press molding. Specifically, the friction material of the present embodiment is obtained by mixing the friction material composition of the present embodiment using a mixer (e.g., a Loedige mixer, a pressure kneader, or an Eirich mixer), pre-molding the resulting mixture in a molding die, heat-molding the thus obtained pre-molded product for 4 minutes to 10 minutes at a molding temperature of from 140° C. to 160° C. and a molding pressure of from 20 MPa to 50 MPa, and then heat-treating the thus obtained molded product for 2 hours to 10 hours at a temperature of from 180° C. to 250° C. Further, as required, the thus obtained friction material may be subjected to coating, scorching, polishing and/or the like.

[Friction Member]

The friction member of the present embodiment includes the friction material of the present embodiment. In the friction member of the present embodiment, it is preferred that the friction material of the present embodiment constitutes a friction surface.

The friction member of the present embodiment encompasses, for example, the following constitutions:

(1) a constitution containing only the friction material;

(2) a constitution which includes a back metal, and the friction material of the present embodiment serving as a friction surface arranged on the back metal; and (3) the constitution of (2) in which a primer layer for modifying the surface to improve the adhesive effect of the back metal to the friction material, and an adhesive layer for adhering the back metal and the friction material are further arranged between the back metal and the friction material.

The friction material composition of the present embodiment exhibits excellent friction coefficient stability, low-frequency noise resistance and crack resistance and is, therefore, useful as an "overlay material" of friction members. Further, the friction material composition of the present embodiment has high crack resistance and, therefore, can also be used as a "lining material" of friction members.

The term "overlay material" refers to a friction material that constitutes a friction surface of a friction member, and the term "lining material" refers to a layer that is arranged between a friction material constituting a friction surface of a friction member and a back metal of the friction member for the purpose of improving the shear strength and the crack resistance in the vicinity of the adhered part of the friction material and the back metal.

Examples

The invention is described below in more detail by way of examples thereof; however, the invention is not restricted to the following examples by any means.

The evaluations described in Examples and Comparative Examples were performed as follows.

(1) Evaluations of Friction Coefficient, Friction Coefficient Stability and Abrasion Resistance The friction coefficient was measured in accordance with SAE J2522 of SAE International and calculated from the average value listed in Section 5 (Characteristics Test).

The abrasion resistance was judged in terms of the abrasion loss of the subject friction material after this test.

Further, the friction coefficient stability was determined from the rate of change between the average values listed in Section 8 and Section 10, which represent before and after the first fade effect of Section 9, and the friction coefficient stability was evaluated based on the following criteria. The rank B is a satisfactory level.

Rank A: The rate of change was 100±5% or lower.

Rank B: The rate of change was higher than 100±5% but 100±10% or lower.

Rank C: The rate of change was higher than 100±10% but 100±15% or lower.

(2) Evaluation of Low-Frequency Noise Resistance

As for the low-frequency noise resistance, the incidence of low-frequency noise during braking, which was determined by a vehicle test in accordance with the JASO C402 standard prescribed by Society of Automotive Engineers of Japan, Inc., was evaluated based on the following criteria. The rank B is a satisfactory level.

Rank A: 0%
Rank B: higher than 0% but 15% or lower
Rank C: higher than 15% but 30% or lower
Rank D: higher than 30%

(3) Evaluation of Crack Resistance

As for the crack resistance, in accordance with the JASO C427 standard prescribed by Society of Automotive Engineers of Japan, Inc., braking (initial speed: 50 km/h, end speed: 0 km/h, deceleration: 0.3 Cc brake temperature before braking: 100° C.) was repeatedly performed at a brake temperature of 400° C. until the thickness of the subject friction material was reduced to half, and crack generation on the side surface and the friction surface of the friction material was measured. The crack generation was evaluated based on the following three-scale criteria. The rank B is a satisfactory level.

Rank A: No crack was generated.

Rank B: A crack of such a size that a 0.1-mm thickness gauge could not be inserted was generated on the friction surface or the side surface of the friction material.

Rank C: A crack of such a size that a 0.1-mm thickness gauge could be inserted was generated on the friction surface or the side surface of the friction material.

It is noted here that a case where a crack of such a size that the thickness gauge could not be inserted was generated on either of the friction surface and the side surface of the friction material and a crack of such a size that the thickness gauge could be inserted was generated on the other surface, or a case where a crack of such a size that the thickness gauge could be inserted was generated on either of the friction surface and the side surface of the friction material and a crack of such a size that the thickness gauge could not be inserted was generated on the other surface, was evaluated as "Rank C".

The evaluation of crack resistance in accordance with JASO C427 was performed at an inertia of 70 kgf·m² using a dynamometer, along with a ventilated disc rotor (manufactured by KIRIU Corporation, material: FC190) and a general pin sliding collet-type caliper. Further, the evaluation of low-frequency noise resistance in accordance with JASO C402 was performed using an ordinary mid-size passenger vehicle (CD class sedan).

Examples and Comparative Examples

Production of Disc Brake Pad

The friction material compositions of Examples and Comparative Examples were each obtained by blending the materials in accordance with the blending ratios shown in Tables 1 to 7. It is noted here that the unit of the amount of each component shown in Tables 1 to 7 is "% by mass" in the respective friction material compositions. Further, in Tables 1 to 7, "–" means that the corresponding component was not incorporated.

The thus obtained friction material compositions were each mixed using a Loedige mixer (manufactured by MATSUBO Corporation, trade name: LOEDIGE MIXER M20), the resulting mixture was pre-molded using a molding press (manufactured by Oji Machine Co., Ltd.), and the thus obtained pre-molded product was heat-press molded for 5 minutes along with a back metal manufactured by Hitachi Automotive Systems, Ltd. using a molding press (manufactured by Sanki Seiko Co., Ltd.) at a molding temperature of 145° C. and a molding pressure of 30 MPa, after which the thus obtained molded product was heat-treated at 200° C. for 5 hours, polished using a rotary polisher, and then scorched at 520° C. for 5 minutes, whereby a disc brake pad (thickness of friction material: 11 mm, projected area of friction material: 52 cm²) was obtained.

For each of the thus obtained disc brake pads, the results of the above-described evaluations are shown in Tables 8 to 14 below.

The materials used in Examples and Comparative Examples are as follows.

(Binder)
Novolac-type phenol resin: manufactured by Hitachi Chemical Co., Ltd. (trade name: PR1950W)

(Organic Filler)
Cashew particle: manufactured by Tohoku Chemical Industries, Ltd. (trade name: FF-1090)
NBR powder: manufactured by Bayer AG (trade name: BAYMOD NXL 38. 20)

(Inorganic Filler)
Graphite: manufactured by Chuetsu Graphite Works Co., Ltd. (trade name: G40, aggregate, G/D ratio: 3.3), average particle size: 470 µm
Graphite: manufactured by Asbury Carbons (trade name: 4058, aggregate, G/D ratio: 3.0), average particle size: 890 µm
Graphite: manufactured by TIMCAL Ltd. (trade name: KS15, aggregate, G/D ratio: 7.3), average particle size: 10 µm
Graphite: classified 4058, average particle size: 1,300 µm, aggregate, G/D ratio: 3.0
Barium sulfate: manufactured by Takehara Kagaku Kogyo Co., Ltd. (trade name: W10)
Mica (phlogopite): manufactured by IMERYS Minerals Japan K.K. (trade name: 20S), average particle size: 1,275 µm
Mica (phlogopite): manufactured by IMERYS Minerals Japan K.K. (trade name: 40S), average particle size: 760 µm
Mica (phlogopite): manufactured by IMERYS Minerals Japan K.K. (trade name: 60S), average particle size: 400 µm
Mica (phlogopite): manufactured by IMERYS Minerals Japan K.K. (trade name: 200S), average particle size: 80 µm
Mica (muscovite): manufactured by IMERYS Minerals Japan K.K. (trade name: 30C), average particle size: 940 µm
Classified mica (phlogopite) 20S, average particle size: 1,700 µm
Tin sulfide: manufactured by Tribotecc GmbH (trade name: STANNOLUBE)
Antimony trisulfide: manufactured by Tribotecc GmbH (trade name: DBPC 2004)
Zinc sulfide: manufactured by Sachtleben Chemie GmbH (trade name: SACHTOLITH HD)
Bismuth sulfide: manufactured by Tribotecc GmbH (trade name: BIS 83)
Molybdenum disulfide: manufactured by Tribotecc GmbH (trade name: MOS XF)
Potassium titanate: manufactured by Toho Material Co., Ltd. (trade name: TOFIX-S)
Zirconia: manufactured by Daiichi Kigenso Kagaku Kogyo Co., Ltd. (trade name: BR12QZ)
Calcium hydroxide: manufactured by Chichibu Lime Industry Co., Ltd. (trade name: SA-149)

(Fiber Substrate)
Aramid fiber (organic fiber): manufactured by Du Pont-Toray Co., Ltd. (trade name: 1F538)
Copper fiber (metal fiber): manufactured by Sunny Metal Inc. (trade name: SCA-1070)
Mineral fiber (inorganic fiber): manufactured by LAPINUS FIBRES B.V. (trade name: RB240 ROXUL)

TABLE 1

| Formulation (% by mass) | | | Example 1 | Example 2 | Example 3 | Example 4 |
|---|---|---|---|---|---|---|
| | Binder | novolac-type phenol resin | 11 | 11 | 11 | 11 |
| | Organic filler | cashew particle | 5 | 5 | 5 | 5 |
| | | NBR powder | 3 | 3 | 3 | 3 |
| | Inorganic-filler | barium sulfate | 20 | 10 | 15 | 15 |
| | | phlogopite average particle size: 1,275 μm | — | — | — | 6 |
| | | phlogopite average particle size: 760 μm | 3 | 9 | 6 | — |
| | | phlogopite average particle size: 400 μm | — | — | — | — |
| | | phlogopite average particle size: 80 μm | — | — | — | — |
| | | muscovite average particle size: 940 μm | — | — | — | — |
| | | graphite average particle size: 890 μm | 2 | 6 | 4 | 4 |
| | | graphite average particle size: 470 μm | — | — | — | — |
| | | graphite average particle size: 10 μm | — | — | — | — |
| | | tin sulfide | — | — | — | — |
| | | antimony trisulfide | — | — | — | — |
| | | zinc sulfide | — | — | — | — |
| | | bismuth sulfide | — | — | — | — |
| | | molybdenum disulfide | — | — | — | — |
| | | potassium titanate | 15 | 15 | 15 | 15 |
| | | zirconia | 18 | 18 | 18 | 18 |
| | | calcium hydroxide | 4 | 4 | 4 | 4 |
| | Fiber substrate | aramid fiber | 4 | 4 | 4 | 4 |
| | | copper fiber | — | — | — | — |
| | | mineral fiber | 15 | 15 | 15 | 15 |

TABLE 2

| Formulation (% by mass) | | | Example 5 | Example 6 | Example 7 | Example 8 | Example 9 |
|---|---|---|---|---|---|---|---|
| | Binder | novolac-type phenol resin | 11 | 11 | 11 | 11 | 11 |
| | Organic filler | cashew particle | 5 | 5 | 5 | 5 | 5 |
| | | NBR powder | 3 | 3 | 3 | 3 | 3 |
| | Inorganic filler | barium sulfate | 15 | 15 | 15 | 15 | 20 |
| | | phlogopite average particle size: 1,275 μm | — | — | 6 | — | 3 |
| | | phlogopite average particle size: 760 μm | — | 6 | — | — | — |
| | | phlogopite average particle size: 400 μm | 6 | — | — | 6 | — |
| | | phlogopite average particle size: 80 μm | — | — | — | — | — |
| | | muscovite average particle size: 940 μm | | | | | |

TABLE 2-continued

|  |  |  | Example 5 | Example 6 | Example 7 | Example 8 | Example 9 |
|---|---|---|---|---|---|---|---|
|  |  | graphite average particle size: 890 μm | 4 | — | — | — | — |
|  |  | graphite average particle size: 470 μm | — | 4 | 4 | 4 | 2 |
|  |  | graphite average particle size: 10 μm | — | — | — | — | — |
|  |  | tin sulfide | — | — | — | — | — |
|  |  | antimony trisulfide | — | — | — | — | — |
|  |  | zinc sulfide | — | — | — | — | — |
|  |  | bismuth sulfide | — | — | — | — | — |
|  |  | molybdenum disulfide | — | — | — | — | — |
|  |  | potassium titanate | 15 | 15 | 15 | 15 | 15 |
|  |  | zirconia | 18 | 18 | 18 | 18 | 18 |
|  |  | calcium hydroxide | 4 | 4 | 4 | 4 | 4 |
|  | Fiber substrate | aramid fiber | 4 | 4 | 4 | 4 | 4 |
|  |  | copper fiber | — | — | — | — | — |
|  |  | mineral fiber | 15 | 15 | 15 | 15 | 15 |

TABLE 3

|  |  |  | Example 10 | Example 11 | Example 12 | Example 13 |
|---|---|---|---|---|---|---|
| Formulation (% by mass) | Binder | novolac-type phenol resin | 11 | 11 | 11 | 11 |
|  | Organic filler | cashew particle | 5 | 5 | 5 | 5 |
|  |  | NBR powder | 3 | 3 | 3 | 3 |
|  | Inorganic filler | barium sulfate | 10 | 20 | 10 | 15 |
|  |  | phlogopite average particle size: 1,275 μm | 9 | — | — | — |
|  |  | phlogopite average particle size: 760 μm | — | — | — | 3 |
|  |  | phlogopite average particle size: 400 μm | — | 3 | 9 | — |
|  |  | phlogopite average particle size: 80 μm | — | — | — | — |
|  |  | muscovite average particle size: 940 μm | — | — | — | — |
|  |  | graphite average particle size: 890 μm | — | — | — | 2 |
|  |  | graphite average particle size: 470 μm | 6 | 2 | 6 | — |
|  |  | graphite average particle size: 10 μm | — | — | — | — |
|  |  | tin sulfide | — | — | — | 5 |
|  |  | antimony trisulfide | — | — | — | — |
|  |  | zinc sulfide | — | — | — | — |
|  |  | bismuth sulfide | — | — | — | — |
|  |  | molybdenum disulfide | — | — | — | — |
|  |  | potassium titanate | 15 | 15 | 15 | 15 |
|  |  | zirconia | 18 | 18 | 18 | 18 |
|  |  | calcium hydroxide | 4 | 4 | 4 | 4 |
|  | Fiber substrate | aramid fiber | 4 | 4 | 4 | 4 |
|  |  | copper fiber | — | — | — | — |
|  |  | mineral fiber | 15 | 15 | 15 | 15 |

TABLE 4

|  |  |  | Example 14 | Example 15 | Example 16 | Example 17 | Example 18 |
|---|---|---|---|---|---|---|---|
| Formulation (% by mass) | Binder | novolac-type phenol resin | 11 | 11 | 11 | 11 | 11 |
|  | Organic filler | cashew particle | 5 | 5 | 5 | 5 | 5 |
|  |  | NBR powder | 3 | 3 | 3 | 3 | 3 |
|  | Inorganic filler | barium sulfate | 5 | 10 | 10 | 10 | 10 |
|  |  | phlogopite average particle size: 1,275 μm | — | — | — | — | — |
|  |  | phlogopite average particle size: 760 μm | 9 | 6 | 6 | 6 | 6 |
|  |  | phlogopite average particle size: 400 μm | — | — | — | — | — |
|  |  | phlogopite average particle size: 80 μm | — | — | — | — | — |
|  |  | muscovite average particle size: 940 μm | — | — | — | — | — |
|  |  | graphite average particle size: 890 μm | 6 | 4 | 4 | 4 | 4 |
|  |  | graphite average particle size: 470 μm | — | — | — | — | — |
|  |  | graphite average particle size: 10 μm | — | — | — | — | — |
|  |  | tin sulfide | 5 | — | — | — | — |
|  |  | antimony trisulfide | — | 5 | — | — | — |
|  |  | zinc sulfide | — | — | 5 | — | — |
|  |  | bismuth sulfide | — | — | — | 5 | — |
|  |  | molybdenum disulfide | — | — | — | — | 5 |
|  |  | potassium titanate | 15 | 15 | 15 | 15 | 15 |
|  |  | zirconia | 18 | 18 | 18 | 18 | 18 |
|  |  | calcium hydroxide | 4 | 4 | 4 | 4 | 4 |
|  | Fiber substrate | aramid fiber | 4 | 4 | 4 | 4 | 4 |
|  |  | copper fiber | — | — | — | — | — |
|  |  | mineral fiber | 15 | 15 | 15 | 15 | 15 |

TABLE 5

|  |  |  | Comparative Example 1 | Comparative Example 2 | Comparative Example 3 | Comparative Example 4 |
|---|---|---|---|---|---|---|
| Formulation (% by mass) | Binder | novolac-type phenol resin | 11 | 11 | 11 | 11 |
|  | Organic filler | cashew particle | 5 | 5 | 5 | 5 |
|  |  | NBR powder | 3 | 3 | 3 | 3 |
|  | Inorganic filler | barium sulfate | 5 | 20 | 11 | 15 |
|  |  | phlogopite average particle size: 1,275 μm | — | — | — | — |
|  |  | phlogopite average particle size: 760 μm | — | 1 | 10 | — |
|  |  | phlogopite average particle size: 400 μm | — | — | — | — |
|  |  | phlogopite average particle size: 80 μm | 6 | — | — | 6 |
|  |  | muscovite average particle size: 940 μm | — | — | — | — |
|  |  | graphite average particle size: 890 μm | — | 4 | 4 | 4 |

TABLE 5-continued

|  |  |  | Comparative Example 1 | Comparative Example 2 | Comparative Example 3 | Comparative Example 4 |
|---|---|---|---|---|---|---|
|  |  | graphite average particle size: 470 μm | — | — | — | — |
|  |  | graphite average particle size: 10 μm | 4 | — | — | — |
|  |  | tin sulfide | — | — | — | — |
|  |  | antimony trisulfide | — | — | — | — |
|  |  | zinc sulfide | — | — | — | — |
|  |  | bismuth sulfide | — | — | — | — |
|  |  | molybdenum disulfide | — | — | — | — |
|  |  | potassium titanate | 15 | 15 | 15 | 15 |
|  |  | zirconia | 18 | 18 | 18 | 18 |
|  |  | calcium hydroxide | 4 | 4 | 4 | 4 |
|  | Fiber substrate | aramid fiber | 4 | 4 | 4 | 4 |
|  |  | copper fiber | 10 | — | — | — |
|  |  | mineral fiber | 15 | 15 | 15 | 15 |

TABLE 6

|  |  |  | Comparative Example 5 | Comparative Example 6 | Comparative Example 7 | Comparative Example 8 |
|---|---|---|---|---|---|---|
| Formulation (% by mass) | Binder | novolac-type phenol resin | 11 | 11 | 11 | 11 |
|  | Organic filler | cashew particle | 5 | 5 | 5 | 5 |
|  |  | NBR powder | 3 | 3 | 3 | 3 |
|  | Inorganic filler | barium sulfate | 15 | 18 | 11 | 15 |
|  |  | phlogopite average particle size: 1,275 μm | — | — | — | — |
|  |  | phlogopite average particle size: 760 μm | — | 6 | 6 | 6 |
|  |  | phlogopite average particle size: 400 μm | — | — | — | — |
|  |  | phlogopite average particle size: 80 μm | — | — | — | — |
|  |  | muscovite average particle size: 940 μm | 6 | — | — | — |
|  |  | graphite average particle size: 890 μm | 4 | 1 | 8 | — |
|  |  | graphite average particle size: 470 μm | — | — | — | — |
|  |  | graphite average particle size: 10 μm | — | — | — | 4 |
|  |  | tin sulfide | — | — | — | — |
|  |  | antimony trisulfide | — | — | — | — |
|  |  | zinc sulfide | — | — | — | — |
|  |  | bismuth sulfide | — | — | — | — |
|  |  | molybdenum disulfide | — | — | — | — |
|  |  | potassium titanate | 15 | 15 | 15 | 15 |
|  |  | zirconia | 18 | 18 | 18 | 18 |
|  |  | calcium hydroxide | 4 | 4 | 4 | 4 |
|  | Fiber substrate | aramid fiber | 4 | 4 | 4 | 4 |
|  |  | copper fiber | — | — | — | — |
|  |  | mineral fiber | 15 | 15 | 15 | 15 |

TABLE 7

| | | | Comparative Example 9 | Comparative Example 10 |
|---|---|---|---|---|
| Formulation (% by mass) | Binder | novolac-type phenol resin | 11 | 11 |
| | Organic filler | cashew particle | 5 | 5 |
| | | NBR powder | 3 | 3 |
| | Inorganic filler | barium sulfate | 15 | 15 |
| | | phlogopite average particle size: 1,700 μm | 6 | — |
| | | phlogopite average particle size: 1,275 μm | — | — |
| | | phlogopite average particle size: 760 μm | — | 6 |
| | | phlogopite average particle size: 400 μm | — | — |
| | | phlogopite average particle size: 80 μm | — | — |
| | | muscovite average particle size: 940 μm | — | — |
| | | graphite average particle size: 1,300 μm | — | 4 |
| | | graphite average particle size: 890 μm | 4 | — |
| | | graphite average particle size: 470 μm | — | — |
| | | graphite average particle size: 10 μm | — | — |
| | | tin sulfide | — | — |
| | | antimony trisulfide | — | — |
| | | zinc sulfide | — | — |
| | | bismuth sulfide | — | — |
| | | molybdenum disulfide | — | — |
| | | potassium titanate | 15 | 15 |
| | | zirconia | 18 | 18 |
| | | calcium hydroxide | 4 | 4 |
| | Fiber substrate | aramid fiber | 4 | 4 |
| | | copper fiber | — | — |
| | | mineral fiber | 15 | 15 |

TABLE 8

| | Example 1 | Example 2 | Example 3 | Example 4 |
|---|---|---|---|---|
| Content of copper as an element (% by mass) | 0 | 0 | 0 | 0 |
| Content of metal fiber other than copper and copper alloy (% by mass) | 0 | 0 | 0 | 0 |
| Friction coefficient | 0.43 | 0.39 | 0.42 | 0.43 |
| Friction coefficient stability | Rank A | Rank B | Rank A | Rank A |
| Abrasion resistance (mm) | 0.84 | 0.88 | 0.79 | 0.81 |
| Low-frequency noise resistance | Rank A | Rank A | Rank A | Rank A |
| Crack resistance | Rank A | Rank B | Rank A | Rank A |

TABLE 9

| | Example 5 | Example 6 | Example 7 | Example 8 | Example 9 |
|---|---|---|---|---|---|
| Content of copper as an element (% by mass) | 0 | 0 | 0 | 0 | 0 |
| Content of metal fiber other than copper and copper alloy (% by mass) | 0 | 0 | 0 | 0 | 0 |
| Friction coefficient | 0.43 | 0.42 | 0.43 | 0.42 | 0.44 |
| Friction coefficient stability | Rank A | Rank A | Rank A | Rank A | Rank B |
| Abrasion resistance (mm) | 0.81 | 0.77 | 0.76 | 0.79 | 0.84 |
| Low-frequency noise resistance | Rank A | Rank A | Rank A | Rank A | Rank A |
| Crack resistance | Rank A | Rank A | Rank A | Rank A | Rank A |

TABLE 10

| | Example 10 | Example 11 | Example 12 | Example 13 |
|---|---|---|---|---|
| Content of copper as an element (% by mass) | 0 | 0 | 0 | 0 |
| Content of metal fiber other than copper and copper alloy (% by mass) | 0 | 0 | 0 | 0 |
| Friction coefficient | 0.42 | 0.43 | 0.40 | 0.45 |
| Friction coefficient stability | Rank B | Rank A | Rank B | Rank A |
| Abrasion resistance (mm) | 0.89 | 0.79 | 0.79 | 0.59 |
| Low-frequency noise resistance | Rank A | Rank A | Rank A | Rank B |
| Crack resistance | Rank B | Rank A | Rank A | Rank A |

TABLE 11

| | Example 14 | Example 15 | Example 16 | Example 17 | Example 18 |
|---|---|---|---|---|---|
| Content of copper as an element (% by mass) | 0 | 0 | 0 | 0 | 0 |
| Content of metal fiber other than copper and copper alloy (% by mass) | 0 | 0 | 0 | 0 | 0 |
| Friction coefficient | 0.40 | 0.43 | 0.39 | 0.41 | 0.43 |
| Friction coefficient stability | Rank B | Rank A | Rank B | Rank A | Rank A |
| Abrasion resistance (mm) | 0.61 | 0.68 | 0.70 | 0.66 | 0.68 |
| Low-frequency noise resistance | Rank A | Rank A | Rank A | Rank A | Rank A |
| Crack resistance | Rank A | Rank A | Rank A | Rank A | Rank A |

TABLE 12

|  | Comparative Example 1 | Comparative Example 2 | Comparative Example 3 | Comparative Example 4 |
|---|---|---|---|---|
| Content of copper as an element (% by mass) | 10 | 0 | 0 | 0 |
| Content of metal fiber other than copper and copper alloy (% by mass) | 0 | 0 | 0 | 0 |
| Friction coefficient | 0.41 | 0.42 | 0.43 | 0.42 |
| Friction coefficient stability | Rank A | Rank C | Rank C | Rank A |
| Abrasion resistance (mm) | 0.81 | 0.85 | 1.19 | 0.89 |
| Low-frequency noise resistance | Rank B | Rank C | Rank A | Rank C |
| Crack resistance | Rank A | Rank C | Rank C | Rank B |

TABLE 13

|  | Comparative Example 5 | Comparative Example 6 | Comparative Example 7 | Comparative Example 8 |
|---|---|---|---|---|
| Content of copper as an element (% by mass) | 0 | 0 | 0 | 0 |
| Content of metal fiber other than copper and copper alloy (% by mass) | 0 | 0 | 0 | 0 |
| Friction coefficient | 0.44 | 0.43 | 0.35 | 0.39 |
| Friction coefficient stability | Rank C | Rank A | Rank C | Rank B |
| Abrasion resistance (mm) | 1.05 | 1.13 | 0.89 | 1.03 |
| Low-frequency noise resistance | Rank D | Rank B | Rank C | Rank D |
| Crack resistance | Rank B | Rank C | Rank A | Rank A |

TABLE 14

|  | Comparative Example 9 | Comparative Example 10 |
|---|---|---|
| Content of copper as an element (% by mass) | 0 | 0 |
| Content of metal fiber other than copper and copper alloy (% by mass) | 0 | 0 |
| Friction coefficient | 0.45 | 0.44 |
| Friction coefficient stability | Rank A | Rank C |
| Abrasion resistance (mm) | 1.34 | 1.23 |
| Low-frequency noise resistance | Rank B | Rank D |
| Crack resistance | Rank C | Rank A |

From Tables 8 to 14, it is seen that, in Examples 1 to 18, although the content of copper as an element was 0% by mass, the friction coefficient, the friction coefficient stability, the abrasion resistance, the low-frequency noise resistance and the crack resistance were all exerted at the same levels as in Comparative Example 1 where the content of copper as an element was 10% by mass. From this, it was found that, by incorporating, as inorganic fillers, at least one of phlogopite or biotite in a total of from 3% by mass to 9% by mass and a graphite in an amount of from 2% by mass to 6% by mass and by controlling the at least one of phlogopite or biotite to have an average particle size of from 340 μm to 1,500 μm and the graphite to have an average particle size of from 450 μm to 1,100 μm, the above-described performances are exerted in a well-balanced manner even at a low content of copper as an element. Furthermore, it was found that the abrasion resistance (abrasion loss) was lower in Examples 13 to 18 where a metal sulfide was incorporated than in Examples 1 to 12 where no metal sulfide was incorporated.

On the other hand, Comparative Examples 2 to 10, in which the average particle size or the content of phlogopite or graphite deviated from the range according to the invention, all showed a reduction in one or more properties of friction coefficient stability, low-frequency noise resistance and crack resistance.

From the above, it was confirmed that the friction material composition of the present embodiment, even without containing copper, exhibits friction coefficient, friction coefficient stability, abrasion resistance, low-frequency noise resistance and crack resistance at equivalent levels as conventional friction material compositions containing a large amount of copper. Moreover, it was confirmed that, in the friction material composition, the abrasion loss can be further reduced and the abrasion resistance can be improved by incorporating a metal sulfide in an amount of from 1% by mass to 9% by mass.

All the documents, patent applications and technical standards that are described in the present specification are hereby incorporated by reference to the same extent as if each individual document, patent application or technical standard is concretely and individually described to be incorporated by reference.

The invention claimed is:

1. A friction material composition comprising:
a binder;
an organic filler;
an inorganic filler; and
a fiber substrate, wherein:
a content of copper as an element is 0.5% by mass or less,
the friction material composition contains at least one of phlogopite or biotite in a total of from 3% by mass to 9% by mass, and a graphite in an amount of from 2% by mass to 6% by mass, as the inorganic filler,
the at least one of phlogopite or biotite has an average particle size of from 340 μm to 1,500 μm, and
the graphite has an average particle size of from 450 μm to 1,100 μm.

2. The friction material composition according to claim 1, further comprising a metal sulfide in an amount of from 1% by mass to 9% by mass.

3. The friction material composition according to claim 2, wherein the metal sulfide is at least one selected from the group consisting of tin sulfide, antimony trisulfide, bismuth sulfide, zinc sulfide, and molybdenum disulfide.

4. The friction material composition according to claim 1, wherein a content of metal fibers contained as the fiber substrate is 1.0% by mass or less.

5. The friction material composition according to claim 1, wherein the graphite is in an aggregate form.

6. The friction material composition according to claim 1, wherein an intensity ratio of a G band and a D band (G/D ratio) of the graphite is from 2.0 to 6.0.

7. The friction material composition according to claim 1, wherein a content of the inorganic filler is from 30% by mass to 80% by mass.

8. The friction material composition according to claim 1, wherein the binder contains a thermosetting resin.

9. The friction material composition according to claim 1, wherein a content of the binder is from 5% by mass to 20% by mass.

10. The friction material composition according to claim 1, wherein the organic filler contains at least one selected from the group consisting of cashew particles and rubber particles.

11. The friction material composition according to claim 1, wherein the organic filler contains cashew particles and rubber particles, and a mass ratio of the cashew particles and the rubber particles (cashew particles: rubber particles) is from 1:4 to 10:1.

12. The friction material composition according to claim 1, wherein a content of the organic filler is from 1% by mass to 20% by mass.

13. The friction material composition according to claim 1, wherein a content of the fiber substrate is from 5% by mass to 40% by mass.

14. A friction material formed utilizing the friction material composition according to claim 1.

15. A friction member comprising the friction material according to claim 14.

* * * * *